June 27, 1944. J. JANDASEK 2,352,482
TURBO TRANSMISSION
Filed Jan. 27, 1941 2 Sheets-Sheet 1

INVENTOR.
JOSEPH JANDASEK
BY
ATTORNEYS

Patented June 27, 1944

2,352,482

UNITED STATES PATENT OFFICE 2,352,482

TURBOTRANSMISSION

Joseph Jandasek, Detroit, Mich., assignor to Bendix Aviation Corporation, South Bend, Ind., a corporation of Delaware Application January 27, 1941, Serial No. 376,151

1 Claim. (Cl. 180—9.2)

This invention relates to power transmitting devices and more particularly to fluid operated turbotransmissions which may be selectively operated to transmit varying degrees of power in forward or reverse directions.

The invention is particularly adapted for use with "track layer" vehicles wherein a plurality of spaced ground engaging members may be driven by separate turbopower transmitting devices in such a manner that the power from an engine or prime mover may be divided between the turbounits in such a manner that forces may be exerted to steer the vehicle. One illustrative example of track laying vehicles wherein this invention is particularly adaptable is armored tanks used for warfare purposes.

An object of this invention is therefore to provide a driving and steering control mechanism for a track laying vehicle wherein the power from an engine may be divided between a pair of spaced turbotransmission units each of which is operably connected to drive a spaced track member in such a manner that the available power may be divided in any desired manner to drive and steer the vehicle.

Another object resides in the provision of novel power transmitting means for a track laying vehicle whereby substantially all of the power of an engine may be exerted to drive the track on one side of the vehicle or may be divided between the tracks in any desired proportion or may drive the spaced tracks in opposite directions to provide a steering control for the vehicle.

A further object of the invention resides in the provision of means for controlling spaced turbopower transmitting devices wherein means are provided to throttle or decrease the power transmitted by one of the turbounits while at the same time increasing the power transmitted by the other turbounit to exert a force to steer a vehicle.

Another object is to provide a plurality of spaced energy absorbing turbine elements having movable reaction members associated therewith in such a manner that the direction of power transmission may be reversed by movement of the reaction members to one of a plurality of settable positions.

Yet another object is to provide a turbotransmission having speed varying means interposed between a driving shaft and a fluid energizing impeller whereby power may be transmitted to the turbodevice at a plurality of varying speeds.

A further object resides in the provision of a novel control means for a turbotransmission device wherein the direction of the flow of power through the device may be reversed by selectively positioning a guide wheel member in one of a plurality of settable positions, and wherein means operated by a progressive movement of the guide wheel toward a different settable position is operative to progressively vary the amount of power transmitted by the device to provide a gradual change of direction of power transmission.

Another object is to provide a plurality of laterally spaced manually operable means which may be selectively actuated to control spaced power transmitting fluid devices to vary the quantity and direction of power transmitted by said devices to exert a force to steer a track laying vehicle.

Yet a still further object of the invention resides in the provision of angularly movable force transmitting means for controlling the position of a guide wheel member with reference to a power transmitting fluid circuit.

A further object resides in the provision of a novel driving and controlling mechanism for a track laying vehicle, such for example as a tank, wherein the power from an engine may be transmitted through a pair of spaced turbounits to be exerted on a pair of spaced track members each of which is operably connected to each turbounit in such a manner that the power of the engine may be employed to drive the vehicle forwardly and backwardly, to steer the vehicle in both directions, and to exert a braking force to hold the vehicle in any desired position.

Another object is to provide an improved power transmitting mechanism for a track laying vehicle whereby the power from an engine may be utilized in an improved manner to drive the tank, to exert forces thereon to cause slow or rapid turns and to exert braking and reverse forces to control the vehicle.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
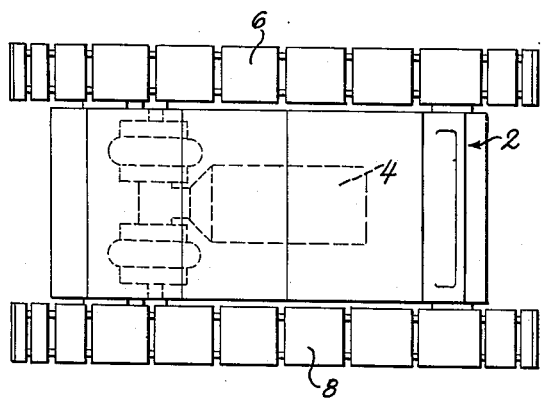
Fig. 1 is a plan view of a track layer vehicle embodying the present invention.
Figure 4:
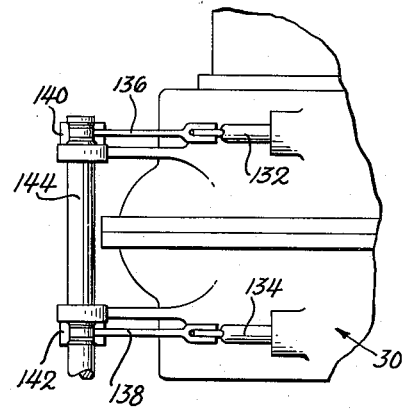
Fig. 4 is a bottom view of the mechanism illustrated in Fig. 3.

Referring now to Fig. 1, it will be observed that the invention is embodied in a turbodriving mechanism which may for example be employed to drive a vehicle of the track layer type such for example as an armored tank 2. The tank 2 has an engine or prime mover 4 and a pair of spaced longitudinally extending tracks 6 and 8 positioned on the left and right sides of the tank respectively.

Power from the engine 4 may be transmitted through a shaft 10 driven by the engine. The shaft 10 may be provided with a pinion gear 12 adapted to be engaged by a gear 14 slidably mounted on a shaft 16 to interconnect suitable gearing including a gear 18 carried by a countershaft to drive the shaft 16 at varying speeds. The shaft 16 is provided with a pinion gear 20 adapted to mesh with and drive a pinion gear 22 carried by a shaft 24 which may be connected to drive another shaft 26 by means of a splined sleeve 28. The shafts 24 and 26 may be operably connected to drive spaced fluid operated turbo-mechanisms 30 and 32 respectively which drive generally oppositely directed shafts 34 and 36 respectively having pinions 38 carried thereby.

Each of the shafts 24 and 26 is connected to an impeller hub 42 having spaced web and shroud members 44 and 46 defining therebetween an impeller channel 48 provided with suitable blades to energize circulating liquid as the impeller is rotated by the shafts 24 or 26 respectively.

Means may be provided to absorb the fluid energy imparted to the circulating fluid in the impeller channel 48 to drive the driven shafts 34 or 36 in forward or reverse directions.

One desirable form of such power absorbing means comprises a plurality of spaced turbine passages 50 and 52 respectively adapted to transmit power to the driven shafts 34 and 36 in forward or reverse directions respectively. The turbine passages 50 and 52 may be provided with suitable fluid directing vanes to deflect the fluid issuing from the impeller passage 48 in such a manner as to exert a turning force to rotate the shafts in the desired direction. The turbine passage 50 for transmitting power in forward direction may be bounded by an external shroud member 54 and an intermediate shroud 56, and the passage 52 for transmitting power in reverse direction may be bounded by the intermediate shroud 56 and an internal shroud member 58. The shroud member 58 is contoured as illustrated to provide a second stage turbine passage 60 bounded by a turbine web 62. The shroud 58 also carries a third stage turbine passage 64 bounded by a turbine web 66 operably connected to a turbine hub 68 each of which is fixed to one of the driven shafts 34 and 36 respectively of the turbounits 30 and 32 respectively.

Means may be provided to direct the fluid issuing from the impeller passage 48 into one of the spaced turbine channels 50 or 52. One desirable form of such fluid deflecting means comprises a guide wheel hub member 70 having helical threads 72 adapted to mesh with helical threads 74 formed in an axially extending portion 76 of a stationary housing 78 concentrically mounted with reference to each of the impeller or turbine members of the units 30 and 32.

The guide wheel hub member 70 may be provided with spaced fluid directing channels 80 and 82 respectively to deflect the fluid issuing from the impeller passage 48 into the forward turbine channel 50 or the reverse turbine channel 52 respectively. It will be observed that the guide wheel hub 70 of the right hand turbine member 32 is illustrated as being positioned in such a manner as to interconnect the impeller channel 48 by way of the guide wheel channel 80 with the forward turbine passage 50 to drive the driven shaft 36 in the same direction as the driving shaft 26 rotates.

The left hand turbounit 30 is illustrated as being positioned in such a manner that the reverse guide wheel channel 82 interconnects the impeller passage 48 and the reverse turbine passage 52 to transmit power to drive the driven shaft 34 in the reverse direction to the direction of rotation of its associated driving shaft 24.

Means may be provided to progressively throttle or close the discharge end of the impeller passage 48 as the guide wheel hub member 70 is moved axially to vary the power transmitting characteristics of the device or to reverse the direction of power output. One suitable form of such throttling means comprises a generally V-shaped baffle 84 between the guide wheel passages 80 and 82 whereby as the guide wheel hub 70 is moved axially with reference to the impeller web and shroud members 44 and 46 respectively, the discharge end of the impeller passage 48 is progressively throttled or closed whereupon the quantity of liquid issuing from the impeller passage 48 and hence the amount of power transmitted by the unit is progressively decreased as the guide wheel hub 70 is actuated. If desired, the baffle 84 may be of sufficient width to completely close the impeller passage 48 whereby circulation of liquid in either of the turbounits 30 or 32 may be interrupted when it is desired to change one of the units 30 or 32 to transmit power in reverse direction relative to the other turbounit or whereby both of the turbounits are operated to transmit power in the reverse direction.

As illustrated in the right hand turbounit 32, a baffle 85 may be provided to substantially or completely close the reverse turbine passage 52 when the guide wheel passage 80 is in the power transmitting fluid circuit to interconnect the impeller passage 48 and the forward turbine passage 50. Referring to the left hand turbounit 30, it will be observed that a baffle 87 carried by the guide wheel hub 70 is provided to substantially or fully close the forward turbine passage 50 when the guide wheel passage 82 is introduced into the power transmitting fluid circuit between the impeller passage 48 and the reverse turbine passage 52.

At this point attention is called to the fact that where this power transmitting mechanism is employed as a driving and steering control mechanism of a track laying vehicle, such for example as a tank, one of the guide wheel hub members 70 may be moved axially to introduce the baffle 84 into the power transmitting fluid circuit thereby throttling or closing the discharge from the impeller passage 48 to decrease the power transmitted by its associated turbounit thereby decreasing the power exerted to drive one of the driven shafts 34 or 36 and increasing the power exerted to drive the other driven shaft 34 or 36 to exert a steering force on the vehicle. Attention is called to the fact that as the discharge from one of the impeller passages 48 is throttled or closed the power transmitted by its associated turbounit will be decreased proportionately with a decrease in the volume or quantity of fluid circulated and the power transmitted by the turbounit on the other side will be correspondingly and proportionately increased.

Guide wheel or reaction means having suitable fluid deflecting vanes to direct the fluid in forward or reverse directions are preferably associated with the second stage turbine passage 60 and the third stage turbine passage 64. One desirable form of such reactionary means comprises a guide wheel hub member 86 having helical threads 88 of steep pitch meshing with cooperating helical threads 90 carried by an axially extending portion 92 of the stationary member 78. The guide wheel hub 86 is provided with second stage forward and reverse passages 94 and 96 having suitable vanes to deflect the fluid issuing from the first stage turbine passage in the appropriate direction, and transmit it to the second stage turbine passage 60. The guide wheel hub 86 is also provided with third stage guide wheel passages 98 and 100 adapted to be selectively introduced into the power transmitting fluid circuit to deflect the fluid in the proper direction before it is transmitted to the third stage turbine passage 64.

The pinions 38 and 40 driven by the turbounits 30 and 32 respectively mesh with gears 102 mounted on axle shafts 104. The shafts 104 are provided with sprocket wheels 106 having suitable projections 108 adapted to engage and drive a ground engaging track or belt 110 having suitable cleats formed thereon to increase traction.

Means may be provided to control the position of the guide wheel hub members 70 and 86 respectively to control the amount and direction of power transmitted by each of the turbounits 30 and 32.

One desirable illustrative form of such means comprises ball joints 120 and 122 operably connected to the guide wheel hub members 70 and 86 of the turbounit 30, and ball joints 124 and 126 respectively operably connected to the guide wheel hub members 70 and 86 of the turbounit 32. The ball joints 120, 122, 124 and 126 may each be actuated by suitable connecting means such for example as a link 128, illustrated in Fig. 3 as being associated with each of the joints 120, 122, 124 and 126, operably connected to another ball joint 130 carried by rods 132 and 134 of the left turbounit 30 and corresponding rods, not illustrated, for the right turbounit 32. The rods 132 and 134 may be operably connected through links 136 and 138 respectively to levers 140 and 142 respectively carried by a shaft 144 for the left turbounit 30.

The right turbounit 32 is provided with a shaft 146 corresponding with the shaft 144 of the left unit. The shaft 146 is provided with spaced levers 148 and 150 operably connected to links 152 and 154 respectively which are operably connected through suitable linkages with the balls 124 and 126 which operate the guide wheels 70 and 86 respectively of the unit 32.

Means may be provided to actuate the guide wheel hubs 70 and 86 at varying speeds relative to each other so as to throttle or decrease the power output of the particular turbounit involved by decreasing the quantity of liquid issuing from its impeller passage 48 before the guide wheel passages carried by the hub 86 are shifted relative to the power transmitting fluid circuit. The baffle 84 may be wider than the guide wheel shrouds 95 and 97 respectively whereby the flow of fluid to the first stage turbine is throttled or decreased before the flow to the second and third stage turbines is throttled or decreased.

Figure 5:
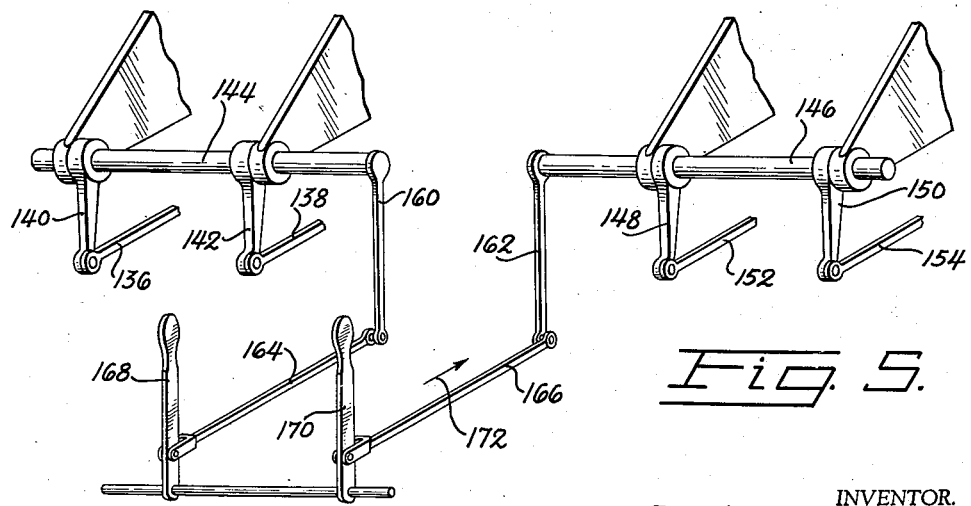
Fig. 5 is a diagrammatic view illustrating a control mechanism for driving, braking and steering the vehicle.
Figure 2:
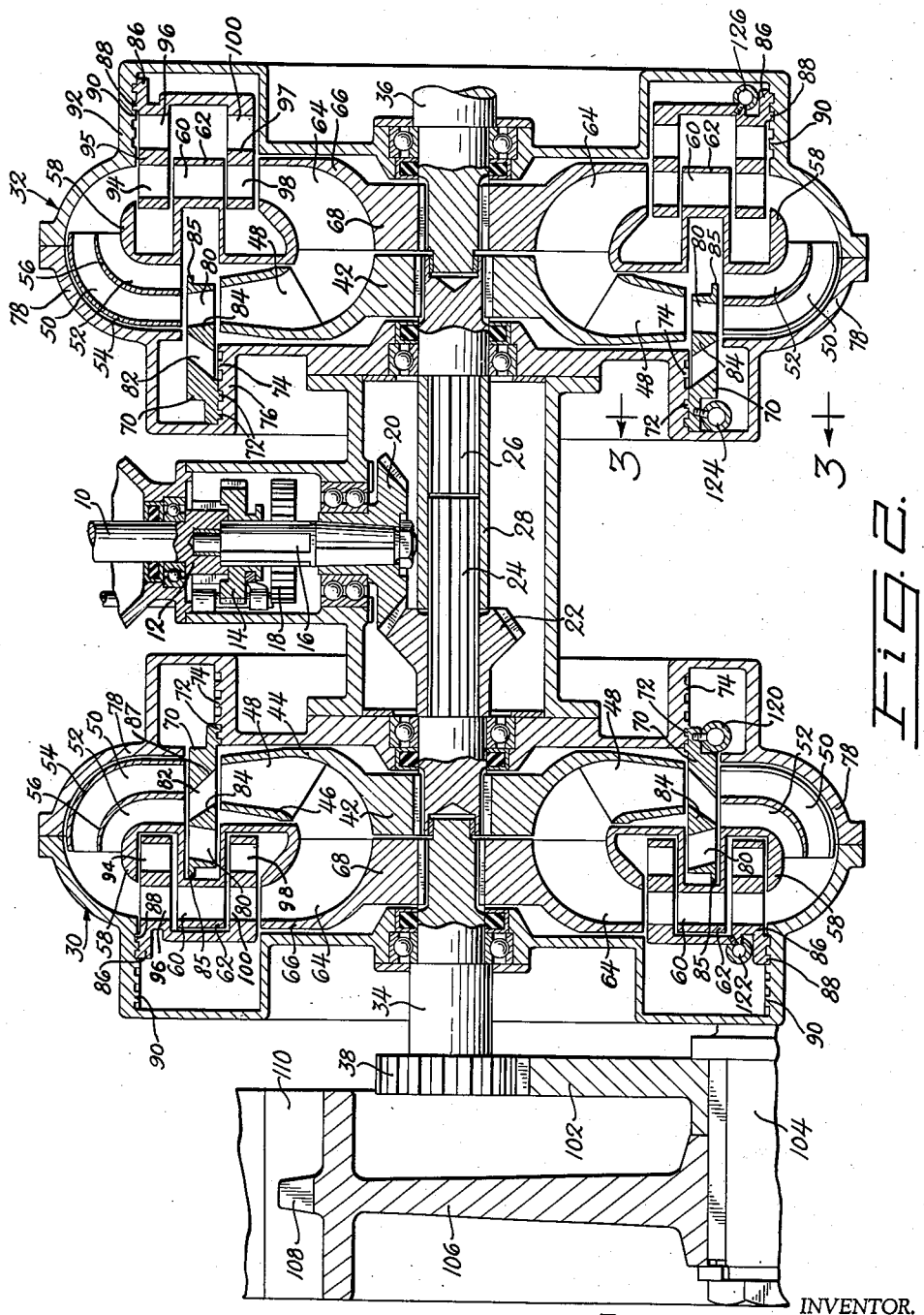
Fig. 2 is a sectional plan view of a device embodying the present invention.

Referring now to Fig. 5, it will be observed that the shafts 144 and 146 controlling the left and right turbounits 30 and 32 respectively may be provided with levers 160 and 162 respectively operably connected through links 164 and 166 with spaced manually operable means such for example as handles 168 and 170 suitably positioned in such a manner that an operator may actuate them forwardly and backwardly to control the quantity and direction of power transmitted by each of the units 30 and 32.

Figure 3:
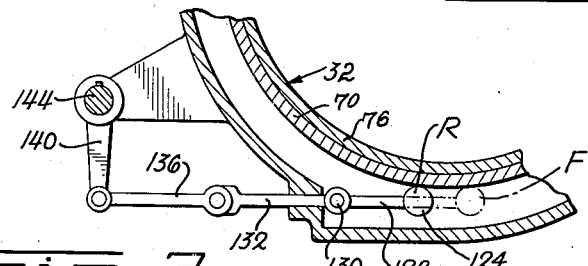
Fig. 3 is a sectional view taken substantially on the line 3—3 of Fig. 2, looking in the direction of the arrows.

In the operation of this device when applied to track laying vehicles such for example as tanks, when it is desired to drive the tank in the forward direction the handles 168 and 170 of Fig. 5 are moved forwardly in the direction of the arrow 172 to position the ball and socket connections of Fig. 3 in the position indicated by the reference character F. The forward guide wheel passages 80, 94 and 98 respectively are then introduced into the fluid circuit of both of the units 30 and 32, ahead of the first stage forward turbine channels 50, the second stage turbine channels 60 and the third stage turbine channels 64 respectively. The quantity of power transmitted to drive the driven shafts 34 and 36 may then be varied by merely controlling the accelerator provided to change the speed of the engine or prime mover.

If it is desired to make a turn such for example as to the left, the handle 168 of Fig. 5 may be pulled backwardly against the direction of the arrow 172 whereupon the guide wheel hub 70 is moved axially to introduce the baffle 84 into the power transmitting fluid circuit to throttle the discharge of the impeller passage 48 of the turbounit 30 thereby decreasing the flow of fluid from its associated impeller passage 48 and proportionately decreasing the power transmitted by the turbounit 30. As decreased power from the engine is absorbed by the impeller of the turbounit 30, the power transmitted to the impeller of the right unit 32 is increased whereupon the power transmitted by the right turbounit 32 is proportionately increased.

This varying of the power transmitted to the tracks on opposite sides of the vehicle results in a turn of a certain radius. If a more rapid turn is desired the handle 168 may be further actuated against the direction of the arrow 172 to more fully close the discharge of the impeller channel 48 whereupon the power transmitted by the turbounit 30 will be still further decreased and the power transmitted by the turbounit 32 may be correspondingly further increased to give a more rapid turn.

If a still more rapid turn is desired the handle 168 may be still further actuated against the direction of the arrow 172 whereupon the guide wheel members 70 and 86 respectively will be shifted axially to position the guide wheel passages 82, 96 and 100 into the power transmitting fluid circuit ahead of the first stage turbine reverse channel 52, the second stage turbine channel 60 and the third stage turbine channel 64 as illustrated in connection with the unit 30. Power will then be transmitted to drive the shaft 34 in the reverse direction and to drive the shaft 36 driven by the turbounit 32 in the forward direction. Power thus applied in opposite directions to the spaced tracks of the vehicle results in a rapid turning of the vehicle. After the desired turning of the vehicle has been effected the manually operable control members are actuated to return the vehicle to the desired direction.

When it is desired to apply a braking force to stop the vehicle as for example when the vehicle is proceeding in the forward direction, the handles 168 and 170 may both be moved against the direction of the arrow 172 whereupon the ball and socket connections of Fig. 3 will occupy the position illustrated by the reference character R. The guide wheel hubs 70 and 86 will be moved axially to position the reverse channels into the power transmitting fluid circuit whereupon the entire power developed by the engine may be effectively utilized to exert a braking force to stop the vehicle. The position of the handles 168 and 170 and the position of the accelerator controlling the power developed by the engine may be manipulated to provide the desired degree of braking or holding force. A vehicle such for example as a tank may thus be maintained on any grade merely by reversing the direction of the power transmitted.

It will be understood that if desired speed varying means may be introduced between the driven shafts 34 and 36 and the tracks 110 which may be actuated to propel the vehicle as more clearly illustrated in my co-pending application Serial No. 376,152, filed January 27, 1941.

Attention is called to the fact that this invention is particularly adapted for use in any drive where it is desirable to provide means to introduce a variable driving force to actuate spaced members, and is in no sense of the word limited to track laying vehicles.

I claim:

In a motor vehicle having an engine, a pair of spaced movable tracks supporting the vehicle and extending longitudinally thereof, means including oppositely directed shafts to propel the tracks longitudinally of the vehicle, a fluid operated transmission connected to each of said shafts, driving means between the engine and the transmissions, each of said fluid operated transmissions comprising rotatable fluid energizing and energy absorbing wheels cooperating to form power transmitting fluid circuits, spaced guide wheel members each having a plurality of spaced fluid deflecting channel portions adapted to be introduced into the power transmitting fluid circuit of each fluid operated transmission, a stationary member associated with each guide wheel member, motion transmitting means including oppositely extending helical threads between each guide wheel member and its associated stationary member whereby the guide wheel members associated with each fluid operated transmission may be progressively and selectively introduced into their associated power transmitting fluid circuits to selectively drive said shafts in opposite directions, a single member operably connected to the guide wheel members of each fluid operated transmission, and manually operable means to independently operate said single members to separately actuate the guide wheel members of one fluid operated transmission relative to the guide wheel members of the other fluid operated transmission.

JOSEPH JANDASEK.